United States Patent
Bae

(10) Patent No.: US 10,396,599 B2
(45) Date of Patent: *Aug. 27, 2019

(54) WIRELESS POWER TRANSMISSION APPARATUS AND WIRELESS POWER TRANSMISSION METHOD

(71) Applicant: LG Innotek Co., Ltd., Seoul (KR)

(72) Inventor: Su Ho Bae, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 259 days.

This patent is subject to a terminal disclaimer.

(21) Appl. No.: 15/380,685

(22) Filed: Dec. 15, 2016

(65) Prior Publication Data

US 2017/0098967 A1 Apr. 6, 2017

Related U.S. Application Data

(63) Continuation of application No. 15/044,996, filed on Feb. 16, 2016, now Pat. No. 9,559,553.

(30) Foreign Application Priority Data

Feb. 16, 2015 (KR) .......................... 10-2015-0023677

(51) Int. Cl.
*H02J 50/80* (2016.01)
*H02J 50/12* (2016.01)
(Continued)

(52) U.S. Cl.
CPC .............. *H02J 50/12* (2016.02); *H02J 7/025* (2013.01); *H02J 50/40* (2016.02); *H02J 50/60* (2016.02); *H02J 50/80* (2016.02)

(58) Field of Classification Search
CPC ................................. H02J 50/40; H02J 50/80
See application file for complete search history.

(56) References Cited

U.S. PATENT DOCUMENTS

2010/0259217 A1  10/2010 Baarman et al.
2013/0018567 A1  1/2013 Lim et al.
(Continued)

FOREIGN PATENT DOCUMENTS

JP  2012-523814 A  10/2012
JP  2013-172640 A  9/2013
(Continued)

*Primary Examiner* — Daniel J Cavallari
(74) *Attorney, Agent, or Firm* — Birch, Stewart, Kolasch & Birch, LLP

(57) ABSTRACT

A wireless power transmission method of a wireless power transmission apparatus having a plurality of power transmission schemes can include a first detection step including transmitting a first detection signal for a first power transmission scheme and detecting a first response signal corresponding to the first detection signal during a first predetermined time period; a second detection step including transmitting a second detection signal for a second power transmission scheme and detecting a second response signal corresponding to the second detection signal during a second predetermined time period; a determination step determining a power transmission scheme of an wireless power reception apparatus between the first power transmission scheme and the second power transmission scheme; and a power transmission step transmitting a power to the wireless power reception apparatus through the power transmission scheme.

10 Claims, 6 Drawing Sheets

(51) Int. Cl.
    *H02J 7/02*       (2016.01)
    *H02J 50/40*     (2016.01)
    *H02J 50/60*     (2016.01)

(56) References Cited

U.S. PATENT DOCUMENTS

| | | |
|---|---|---|
| 2013/0214612 A1 | 8/2013 | Bae |
| 2014/0084701 A1 | 3/2014 | Bae |
| 2014/0139034 A1 | 5/2014 | Sankar et al. |
| 2014/0239728 A1 | 8/2014 | Yamakawa et al. |
| 2015/0194815 A1 | 7/2015 | Rofe et al. |
| 2015/0357827 A1 | 12/2015 | Muratov et al. |
| 2016/0094048 A1 | 3/2016 | Bae |

FOREIGN PATENT DOCUMENTS

| | | | |
|---|---|---|---|
| KR | 10-2012-0047027 A | 5/2012 | |
| KR | 10-2013-0008272 A | 1/2013 | |
| WO | WO-2014119035 A1 * | 8/2014 | .............. H02J 50/10 |

* cited by examiner

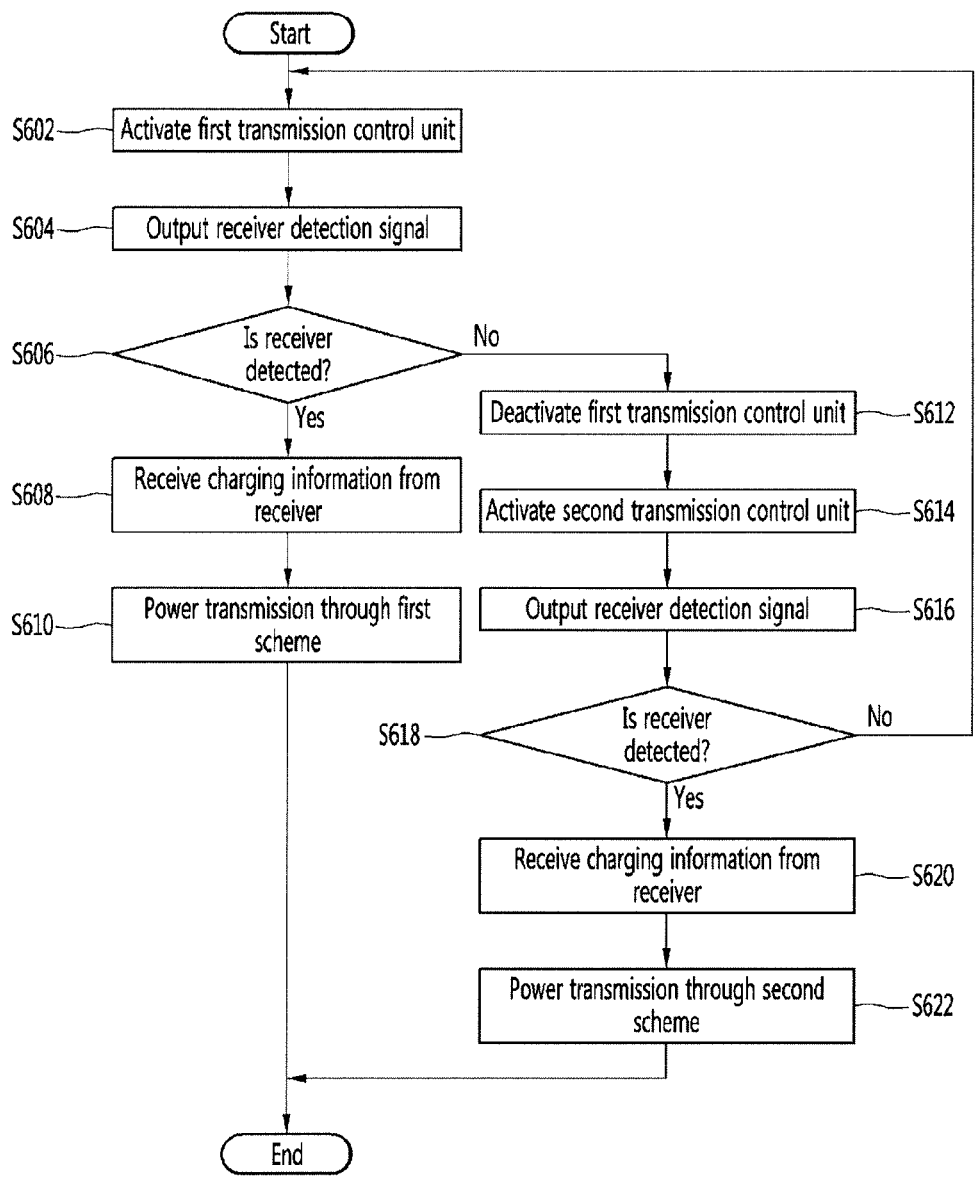

WIRELESS POWER TRANSMISSION APPARATUS AND WIRELESS POWER TRANSMISSION METHOD

CROSS REFERENCE TO RELATED APPLICATIONS

This application is a Continuation of co-pending U.S. application Ser. No. 15/044,996, filed on Feb. 16, 2016, which claims the benefit under 35 U.S.C. § 119(a) to Patent Application No. 10-2015-0023677, filed in Korea on Feb. 16, 2015, which is hereby expressly incorporated by reference into the present application.

BACKGROUND OF THE INVENTION

The embodiment relates to a wireless power transmission apparatus and a wireless power transmission method.

In general, various electronic devices are equipped with batteries and operated using power charged in the batteries. In this case, the battery is replaceable and rechargeable in the electronic device. To this end, the electronic device is equipped with a connecting terminal for a connection with an external charging device for charging the battery. In other words, the electronic device is electrically connected with the charging device through the connecting terminal. However, because the connecting terminal in the electronic device is exposed to the outside, the connecting terminal may be contaminated with foreign matters or shorted due to moisture. In this case, connection failures occur between the connecting terminal and the charging device so that the battery in the electronic device may not be charged.

In order to solve the above problem, there has been suggested a wireless power charging system. The wireless power charging system includes a wireless power transmission apparatus and a wireless power reception apparatus. In this case, the electronic device is implemented as the wireless power reception apparatus. In addition, the wireless power transmission apparatus transmits the power through a wireless transmission unit and the wireless power reception apparatus receives the power through a wireless reception unit.

A scheme of implementing a wireless charging system is typically classified into a magnetic induction scheme and a magnetic resonance scheme.

The magnetic induction scheme is a contactless energy transmission technique which applies current to one of two adjacent coils and generates electromotive force in the other coil through a medium of a magnetic flux generated from one coil, and the magnetic induction scheme may utilize a frequency of several hundreds of kHz.

The magnetic resonance scheme is a magnetic resonance technique which uses an electric or magnetic field without using any electromagnetic waves or electric currents, and the magnetic resonance scheme may have a transmissible distance of several meters or more and use a bandwidth of several tens of MHz.

If the wireless power transmission apparatus is constructed with the combination of the above charging schemes, the magnetic fields generated from the coils may interfere with each other so that the two charging modes may not normally operate. In addition, if the independent charging scheme is adopted, the high cost and degradation of components may be caused because installation and setting of dedicated hardware and software are required.

SUMMARY OF THE INVENTION

The embodiment provides a wireless power transmission apparatus representing improved performance.

The embodiment provides a wireless power transmission apparatus operated with various wireless power transmission schemes.

The embodiment provides a wireless power transmission apparatus including a first power converting unit to generate high-frequency AC signals; a second power converting unit to generate low-frequency AC signals; a first coil receiving the high-frequency AC signals and transmitting a wireless power through a first power transmission scheme; a second coil receiving the low-frequency AC signals and transmitting the wireless power through a second power transmission scheme; and a control unit to control the first and second coils, wherein the control unit is configured to transmit a detection signal for the first power transmission scheme to a wireless power reception apparatus through the first coil, detect a reception of a first response signal corresponding to the first detection signal during a first predetermined time, determine a power transmission scheme of the wireless power reception apparatus as the first power transmission scheme in response to a detection of the first response signal, and deactivate the first power converting unit in response to no detection of the first response signal.

The embodiment provides a wireless power transmission method including activating a first transmission control unit that detects a first power transmission scheme; transmitting a detection signal for the first power transmission scheme to a wireless power reception apparatus; detecting a reception of a first response signal corresponding to the first detection signal during a first predetermined time; determining a power transmission scheme of the wireless power reception apparatus as the first power transmission scheme in response to a detection of the first response signal; and deactivating the first transmission control unit in response to no detection of the first response signal.

The wireless power transmission apparatus according to the embodiment is a combination type wireless power transmission apparatus equipped with induction and resonance schemes, which can provide maximum power through various schemes with a simple configuration and reduce the cost through the common use of components.

BRIEF DESCRIPTION OF THE DRAWINGS

FIG. 6 is a flowchart showing a wireless power transmission operation according to one embodiment.

DETAILED DESCRIPTION OF THE EMBODIMENTS

Figure 1:
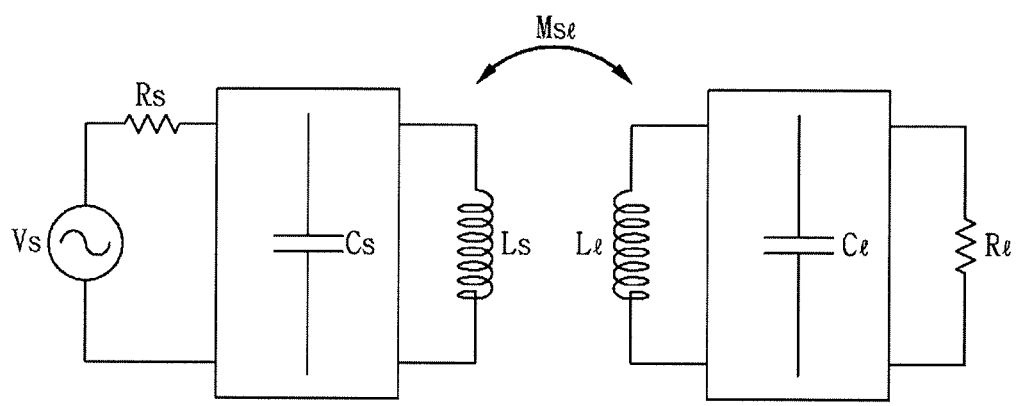
FIG. 1 is an equivalent circuit of a magnetic induction scheme.

Hereinafter, a wireless power transfer system according to an embodiment will be described with reference to accompanying drawings. Although embodiments have been described with reference to a number of illustrative embodiments thereof, it should be understood that numerous other modifications and embodiments can be devised by those skilled in the art that will fall within the spirit and scope of the principles of this disclosure. The thickness and size of an apparatus shown in the drawings may be exaggerated for the purpose of convenience or clarity. The same reference numerals denote the same elements throughout the specification.

The embodiment selectively uses various types of frequency bandwidths in the range of a low frequency wave (50 kHz) to a high frequency wave (15 MHz) for transmitting wireless power, and requires a support of a communication system which is capable of exchanging data and control signals for system control.

The embodiment can be employed in various industrial fields, such as a mobile terminal industry, a smart clock industry, a computer and laptop industry, an electronic device industry, an electric vehicle industry, a medical device industry, a robot industry, etc.

The embodiment may include a system capable of transmitting power to one or more devices by using one or multiple transmission coils constituting the device.

According to the embodiment, the problem of low battery for mobile devices such as smartphones, laptops, etc. can be solved. For example, when the smartphone and the laptop are seated and used on a wireless charging pad on a table, the battery is automatically charged and used for a long period of time. In addition, when the wireless charging pad is installed at public areas such as coffee shops, airports, taxis, offices, restaurants, etc., various mobile devices can be charged regardless of charging terminals which may vary depending on the manufacturer of the mobile device. Further, when the wireless power transfer technology is employed in electrical appliances such as vacuum cleaners, electric fans, etc., users may not need to look for the power cable, and tangled electrical cables can be eliminated at home so wirings in buildings can be reduced and space can be more efficiently utilized. In addition, a long period of time is required when an electric vehicle is charged by a typical household power source. However, when a high amount of power is transmitted through the wireless power transfer technology, charging time can be reduced, and when wireless charging equipment is installed at a floor of a parking lot, an inconvenience of preparing a power cable in the vicinity of the electrical vehicle can be relieved.

Terms and abbreviations used in the embodiment are as follows.

Wireless Power Transfer System: A system for transmitting wireless power in a magnetic field region.

Wireless Power Transfer System-Charger: An apparatus for transmitting wireless power to a signaler or multiple power devices in a magnetic field region and for managing the entire system.

Wireless Power Transfer System-Device: An apparatus for receiving wireless power from a wireless power transfer system-charger in a magnetic field region.

Charging Area: An area in which the wireless power is transmitted in the magnetic field region, and which may vary according to a size of an application product, required power and an operating frequency.

Scattering parameter: A scattering parameter is a ratio of an input voltage to an output voltage in a frequency distribution, a ratio of an input port to an output port (Transmission; S21) or a self-reflection value of each input/output port, in other words, a value of an output reflecting back by a self-input (Reflection; S11, S22).

Quality factor (Q): A value of Q in a resonant state designates a quality of frequency selection, in which a resonance characteristic is better when the value of Q is higher, and the value of Q is expressed as a ratio of stored energy to energy loss in a resonator.

The principle of wirelessly transferring power mainly includes a magnetic induction scheme and a magnetic resonance scheme.

The magnetic induction scheme is a contactless energy transmission technique which applies current to a source inductor Ls adjacent to a load inductor Ll such that electromotive force is generated in the load inductor Ll through a medium of a magnetic flux generated from the source inductor Ls. In addition, the magnetic resonance scheme generates a magnetic resonance from a natural frequency between two resonators by coupling the two resonators to utilize a resonance scheme for forming an electric field and a magnetic field in the same wavelength range while fluctuating in a same frequency thereby wirelessly transferring energy.

FIG. 1 is an equivalent circuit of a magnetic induction scheme.

Referring to FIG. 1, in the equivalent circuit of the magnetic induction scheme, the wireless power transfer system-charger may be implemented by a source voltage $V_s$ according to an apparatus for supplying power, a source resistance Rs, a source capacitor $C_s$ for impedance matching and a source coil Ls for a magnetic coupling with the wireless power transfer system-device. The wireless power transfer system-device may be implemented by a load resistance $R_l$ which is an equivalent resistance of the wireless power transfer system-device, a load capacitor $C_l$ for impedance matching, and a load coil $L_l$ for the magnetic coupling with the wireless power transfer system-charger, in which the degree of magnetic coupling between the source coil $L_s$ and the load coil $L_l$ may be denoted as a mutual inductance $Ms_l$.

In FIG. 1, a ratio S21 of an input voltage to an output voltage from a magnetic induction equivalent circuit including only a coil without the source capacitor $C_s$ and the load capacitor $C_l$ for the impedance matching is calculated and when a maximum power transmission condition is found from the calculation, the maximum power transmission condition satisfies the following equation 1.

$$L_s/R_s = L_l/R_l \qquad \text{Equation 1}$$

According to the equation 1, a maximum power transmission is possible when a ratio of an inductance of the transmission coil $L_s$ to the source resistance $R_s$ is the same as a ratio of an inductance of the load coil $L_l$ to the load resistance $R_l$. Because a capacitor for compensating for a reactance does not exist in a system in which only an inductance exist, a self-reflection value S11 of an input/output port at a position on which maximum power is transferred may not be 0, and a maximum transfer efficiency may be varied according to the mutual inductance $Ms_l$. Accordingly, the source capacitor $C_s$ may be added to the wireless power transfer system-charger and the load capacitor $C_l$ may be added to the wireless power transfer system-device for compensation capacitors for the impedance matching. The compensation capacitors $C_s$, $C_l$, for example, may be serially connected or connected in parallel with each of the reception coil $L_s$ and the load coil $L_l$, respectively. In addition, passive elements such as an additional capacitor and an inductor may be added along with the compensation capacitors to each of the wireless power transfer system-charger and the wireless power transfer system-device for the impedance matching.

Figure 2:
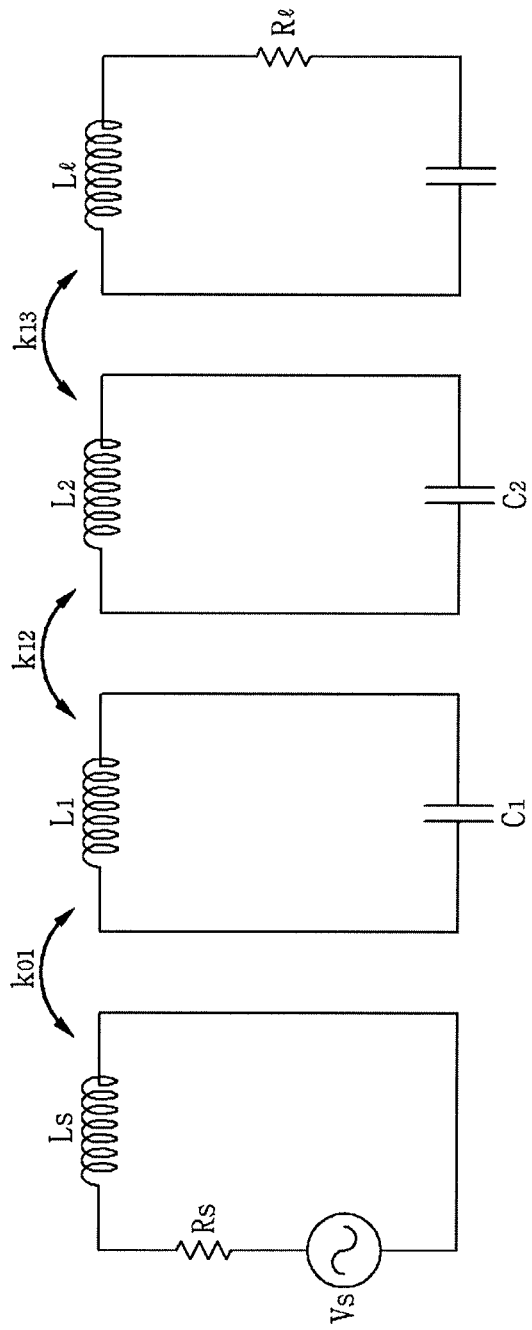
FIG. 2 is an equivalent circuit of a magnetic resonance scheme.

FIG. 2 is an equivalent circuit of a magnetic resonance scheme.

Referring to FIG. 2, in the magnetic resonance scheme equivalent circuit, the wireless power transfer system-charger may be implemented by a source coil forming a closed loop circuit by a serial connection of the source voltage $V_s$, the source resistance $R_s$ and the source inductor $L_s$, and a transmission side resonance coil forming a closed loop circuit by a serial connection of a transmission side resonance inductor $L_1$ and a transmission side resonance capacitor $C_1$, the wireless power transfer system-device may be implemented by a load coil forming a closed loop circuit by a serial connection of the load resistance $R_l$ and the load inductance $L_l$ and a reception side resonance coil forming a closed loop circuit of a reception side resonance inductor L2 and a reception side resonance capacitor $C_2$, in which the source inductor (Ls) and the transmission side inductor $L_1$ are magnetically coupled in a coupling coefficient of K01, the load source inductor $L_s$ and the load side resonance inductor $L_2$ are magnetically coupled in a coupling coefficient of K23, and the transmission side resonance inductor $L_1$ and the reception side resonance inductor $L_2$ are magnetically coupled in a coupling coefficient of K12.

In the magnetic resonance scheme, most of the energy in the resonator of the wireless power transfer system-charger is transferred to the resonator of the wireless power transfer system-device when the resonance frequency of the two resonators are the same, so that the power transfer efficiency can be improved and the efficiency of the magnetic resonance scheme becomes better when satisfying the following equation 2.

$k/\Gamma \gg 1$ ($k$ is a coupling coefficient, $\Gamma$ is a damping ratio)   Equation 2

In the magnetic resonance scheme, an element for the impedance matching may be added to improve the efficiency, and the impedance matching element may be a passive element such as an inductor and a capacitor.

A system for transmitting wireless power, in which power is transferred by the magnetic induction scheme or the magnetic resonance scheme based on the principle for transmitting wireless power, will be examined below.

Figure 3:
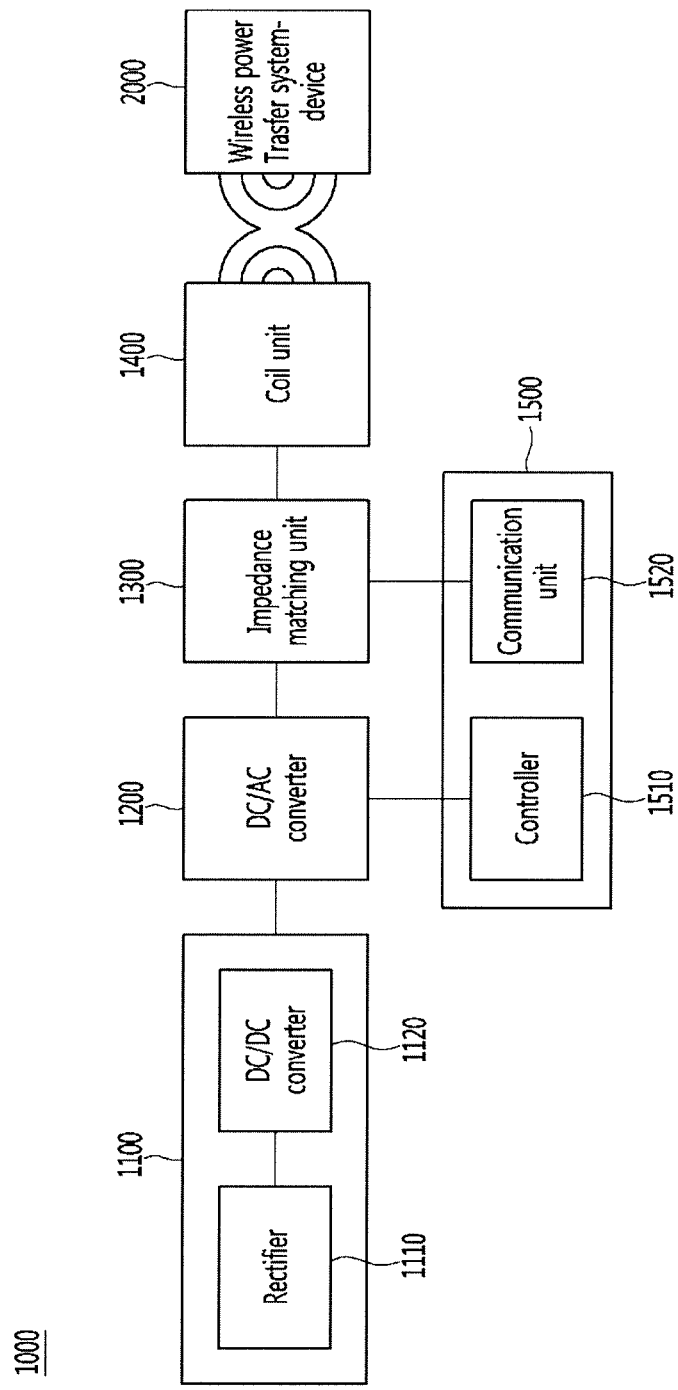
FIG. 3 is a block diagram showing a wireless power transfer system-charger, which is one of a sub-system constituting a wireless power transfer system.

FIG. 3 is a block diagram showing a wireless power transfer system-charger, which is one of a sub-system constituting a wireless power transfer system.

Referring to FIG. 3, the system for transmitting wireless power may include the wireless power transfer system-charger 1000 and the wireless power transfer system-device 2000 which wirelessly receives power from the wireless power transfer system-charger 1000, in which the wireless power transfer system-charger 1000 may include a transmission side AC/DC converting unit 1100, a transmission side DC/AC converting unit 1200, a transmission side impedance matching unit 1300, a transmission coil unit 1400 and a transmission side communication and control unit 1500.

The transmission side AC/DC converting unit 1100 is a power converter which converts an AC signal received from the outside under the control of the transmission side communication and control unit 1500 to a DC signal, in which the transmission side AC/DC converting unit 1100 may be a sub-system including a rectifier 1110 and a transmission side AC/DC converter 1120. The rectifier 1110 is a system for converting the supplied AC signal to the DC signal, and for an embodiment for implementing the rectifier 1110, a diode rectifier having a relatively high efficiency when operating at high frequencies, a synchronous rectifier prepared as one-chip, or a hybrid rectifier by which cost and space can be reduced and having a high freedom of a dead time may be used. In addition, the transmission side DC/DC converter 1120 controls a level of the DC signal provided by the rectifier 1100 under the control of the transmission side communication and control unit 1500, and for an embodiment for implementing the transmission side DC/DC converter 1120, a buck converter which lowers a level of the input signal, a boost converter which increases the level of the input signal and a buck boost converter or a Cuk converter which lowers or increases the level of the input signal may be used. In addition, the transmission side DC/DC converter 1120 may include a switching device which controls a power conversion, an inductor and a capacitor which smooth the output voltage, and a transformer which modifies a voltage gain or performs an electrical separation (insulation) function, and remove a ripple component or a pulsation component (AC component included in DC component) included in the DC signal. Further, an error between a command value of the output signal of the transmission side DC/DC converter 1120 and an actual output value may be controlled through a feedback scheme, which can be performed by the transmission side communication and control unit 1500.

The transmission side DC/AC converter 1200 is a system capable of converting the DC signal outputted from the transmission side AC/DC converting unit 1100 to the AC signal under the control of the transmission side communication and control unit 1500 and controlling a frequency of the converted AC signal, and for an embodiment for implementing the transmission side DC/AC converter 1200, a half bridge inverter or a full bridge inverter may be used. In addition, the transmission side DC/AC converter 1200 may include an oscillator to generate the frequency of the output signal and a power amplifying unit to amplify the output signal.

The transmission side impedance matching unit 1300 minimizes a reflection wave at a position at which impedances are different thereby improving a flow of the signal. The two coils of the wireless power transfer system-charger 1000 and the wireless power transfer system-device 2000 are spatially separated from each other so a large amount of the magnetic field is leaked, so that an efficiency of power transfer may be improved by compensating for the impedance difference between the two connecting parts of the wireless power transfer system-charger 1000 and the wireless power transfer system-device 2000. The transmission side impedance matching unit 1300 may include an inductor, a capacitor and a resistor, and may modify an impedance value for the impedance matching by varying an inductance of the inductor, a capacitance of the capacitor and a resistance value of the resistor under the control of the transmission side communication and control unit 1500. In addition, when the wireless power transfer system transfers power by the magnetic induction scheme, the transmission side impedance matching unit 1300 may have a serial resonance structure or a parallel resonance structure, and energy loss can be minimized by increasing an induction coupling coefficient between the wireless power transfer system-charger 1000 and the wireless power transfer system-device 2000. Further, when the wireless power transfer system transfers power by the magnetic resonance scheme, the transmission side impedance matching unit 1300 allows the impedance to be matched in real-time according to a change in the distance between the wireless power transfer system-charger 1000 and the wireless power transfer system-device 2000 or mutual influence from metallic foreign substances and various devices, and a multiple matching scheme using a capacitor, a matching scheme using multiple antennas, a scheme using multiple loops may be used for the compensation scheme.

The transmission side coil 1400 may be implemented by a plurality of coils or a single coil, and, when the transmission side coil 1400 includes a plurality of coils, the coils may be spaced apart from each other or overlapping, and when the coils are overlapping, an overlapped area may be determined by taking a deviation of the magnetic flux density into consideration. In addition, the transmission side coil 1400 may be produced by taking an internal resistance and a radiation resistance into consideration, and in this case, when the resistance component is small, the quality factor and the transmission efficiency can be improved.

The communication and control unit 1500 may be a sub-system including a transmission side controller 1510 and a transmission side communication unit 1520. The transmission side controller 1510 may control the output voltage of the transmission side AC/DC converter 1100 by considering an amount of required power, a currently charged amount and a wireless power scheme of the wireless power transfer system-device 2000. In addition, the power to be transmitted may be controlled by generating a frequency and a switching waveform to drive the transmission side DC/AC converter 1200 by taking the maximum power transmission efficiency into consideration. Further, an algorithm, a program or an application required for the control which is read from a storage unit (not shown) of the wireless power transfer system-device 2000 may be used to control an overall operation of the wireless power transfer system-device 2000. Meanwhile, the transmission side controller 1510 may signify a microprocessor, a micro-controller unit or a micom. The transmission side communication unit 1520 may communicate with a reception side communication unit 2620, and for an example of a communication scheme, a Bluetooth scheme may be used. The transmission side communication unit 1520 and the reception side communication unit 2620 may transceive charging status information and charging control command with each other. In addition, the charging status information may include a number of the wireless power transfer system-device 2000, a residual energy of a battery, a number of charging operations, an amount of usage, a capacity of the battery, a ratio of the battery and an amount of transferred power of the wireless power transfer system-charger 1000. Further, the transmission side communication unit 1520 may transmit a charging function control signal to control a charging function of the wireless power transfer system-device 2000, and the charging function control signal may indicate to enable or disable for receiving wireless power of controlling the wireless power transfer system-device 2000.

Meanwhile, the wireless power transfer system-charger 1000 may include a hardware different from the transmission side communication unit 1520 so that the wireless power transfer system-charger 1000 may communicate in an out-band type. In addition, the wireless power transfer system-charger 1000 and the transmission side communication unit 1520 may be implemented as single hardware, so that the wireless power transfer system-charger 1000 may communicate in an in-band type. Further, the transmission side communication unit 1520 may be separately provided from the transmission side controller 1510, and the reception side communication unit 2620 may be included in the controller 2610 of the reception device or separately provided from the controller 2610 of the reception device.

Figure 4:
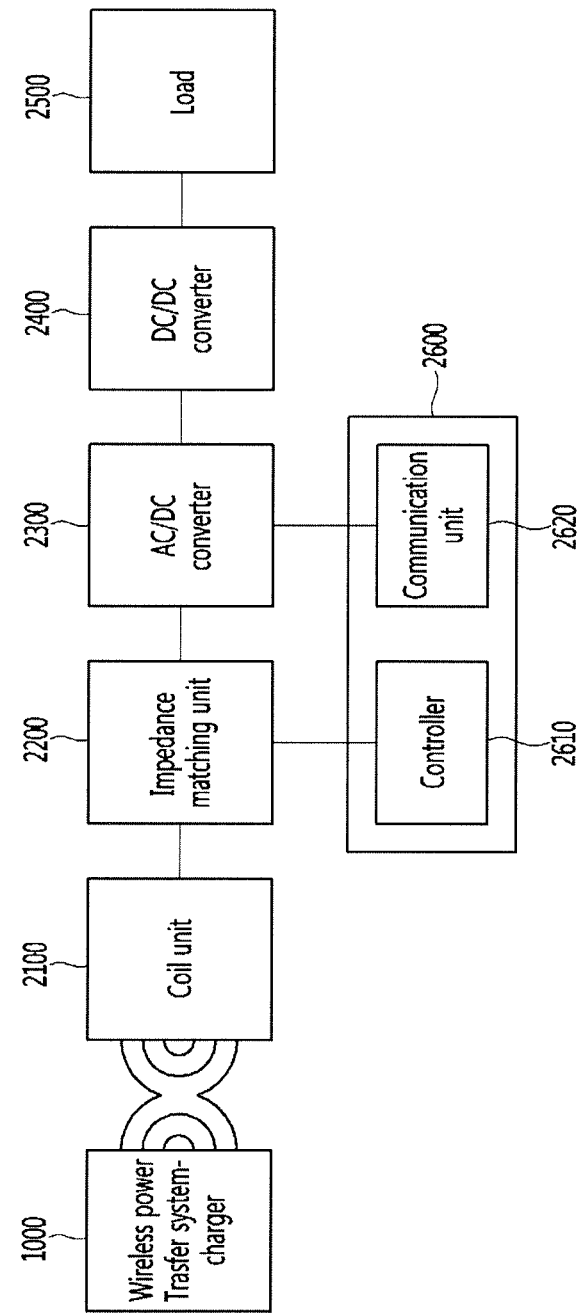
FIG. 4 is a block diagram showing a wireless power transfer system-device, which is one of a sub-system constituting the wireless power transfer system.

FIG. 4 is a block diagram showing a wireless power transfer system-device, which is one of a sub-system constituting the wireless power transfer system.

Referring to FIG. 4, the wireless power transfer system may include the wireless power transfer system-charger 1000 and the wireless power transfer system-device 2000 which wirelessly receives power from the wireless power transfer system-charger 1000, in which the wireless power transfer system-device 2000 may include a reception side coil unit 2100, a reception side impedance matching unit 2200, a reception side AC/DC converter 2300, a DC/DC converter 2400, a load 2500 and a reception side communication and control unit 2600.

The reception side coil unit 2100 may receive the power through the magnetic induction scheme or the magnetic resonance scheme. Accordingly, the reception side coil unit 2100 may include at least one of an induction coil and a resonance coil according to the power reception scheme. In addition, the reception side coil unit 2100 may further include Near Field Communication. Further, the reception side coil unit 2100 may be same as the transmission side coil unit 1400, and a specification of a reception antenna may vary according to an electrical characteristic of the wireless power transfer system-device 2000.

The reception side impedance matching unit 2200 may match the impedance between the wireless power transfer system-charger 1000 and the wireless power transfer system-device 2000.

The reception side AC/DC converter 2300 generates a DC signal by rectifying the AC signal outputted by the reception side coil unit 2100.

The reception side DC/DC converter 2400 may control a level of the DC signal outputted by the reception side AC/DC converter 2300 in match with the capacitance of the load 2500.

The load 2500 may include a battery, a display, an audio output circuit, a main processor and various sensors.

The reception side communication and control unit 2600 may be activated by a wake-up power from the transmission side communication and control unit 1500, communicate with the transmission side communication and control unit 1500, and control a sub-system of the wireless power transfer system-device 2000.

A plurality of a single wireless power transfer system-device 2000 may be provided to simultaneously and wirelessly receive energy from the wireless power transfer system-charger 1000. In other words, in the wireless power transfer system using the magnetic resonance scheme, a plurality of the wireless power transfer system-devices 2000 may receive power from one wireless power transfer system-charger 1000. In this case, the transmission side matching unit 1300 of the wireless power transfer system-charger 1000 may adaptively match the impedance between the wireless power transfer system-devices 2000. This may be similarly employed even when the magnetic induction scheme includes a plurality of coil units which are independent from each other.

In addition, when a plurality of the wireless power transfer system-devices 2000 are provided, the systems may have the same power reception scheme or different power reception schemes. In this case, the wireless power transfer system-charger 1000 may be a system transmitting power in the magnetic induction scheme or the magnetic resonance scheme or a system using both schemes.

Meanwhile, when a size and a frequency of the signal of the wireless power transfer system are examined, in the case of the magnetic induction scheme, the transmission side AC/DC converting unit 1100 may receive an AC signal of 110 V to 220 V and 60 Hz, convert the AC signal to a DC signal of 10 V to 20 V and output the DC signal in the wireless power transfer system-charger 1000, and the transmission side DC/AC converter 1200 may receive the DC signal and output an AC signal of 125 kHz. In addition, the wireless power transfer system-device 2000 receives the AC signal of 125 KHz and converts the AC signal to a DC signal of 10 V to 20 V, and the reception side DC/DC converter 2400 may output the DC signal, for example a DC signal of 5 V, appropriate for the load 2500 and transfer the DC signal to the load 2500. In addition, in the case of the wireless power transmission using the magnetic resonance scheme, the transmission side AC/DC converter 1100 may receive an AC signal of 110 V to 220 V and 60 Hz, convert the AC signal to a DC signal of 10 V to 20 V and output the DC signal, and the transmission side DC/AC converter 1200 may receive the DC signal and output an AC signal having a frequency of 6.78 MHz in the wireless power transfer system-charger 1000. Further, the reception side AC/DC converter 2300 may receive the AC signal having the frequency of 6.78 MHz, convert the AC signal to a DC signal having a voltage of 10 V to 20 V, and output the DC signal, the DC/DC converter 2400 may output a DC signal, for example the DC signal of 5 V, appropriate for the load 2500 and transfer the DC signal to the load 2500.

Figure 5:
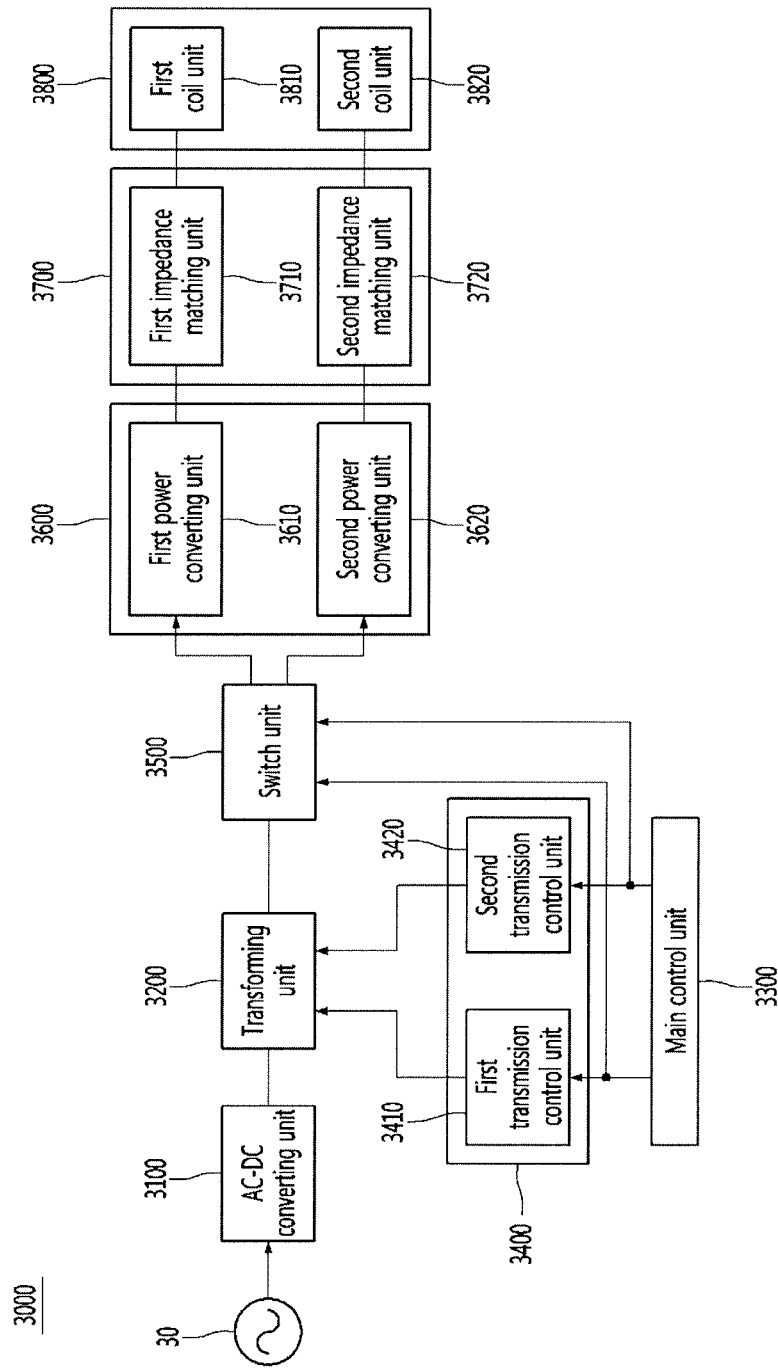
FIG. 5 is a block diagram showing a wireless power transmission apparatus according to an embodiment.

FIG. 5 is a block view showing a wireless power transmission apparatus according to the embodiment.

Referring to FIG. 5, the wireless power transmission apparatus according to the embodiment may include an AC-DC converting unit 3100, a transforming unit 3200, a main control unit 3300, a transmission control unit 3400, a switch unit 3500, a power converting unit 3600, a matching unit 3700 and a coil unit 3800.

The AC-DC converting unit 3100 may convert AC power received from a power supply unit 30 into DC voltage.

The transforming unit 3200 may adjust a level of the DC power output from the AC-DC converting unit 3100 based on a control signal.

Since the operation of the transforming unit 3200 is based on the conversion of a DC input into a DC output, the transforming unit 3200 may be called an SMPS (Switched Mode Power Supply), a DC-DC transformer or a DC-DC converter.

The transforming unit 3200 may include one of a buck converter of which an output voltage is lower than an input voltage, a boost converter of which an output voltage is higher than an input voltage, and a buck-boost converter having the characteristics of the above-mentioned converters.

A control unit may include the main control unit 3300 and the transmission control unit 3400.

The main control unit 3300 may control the level of DC voltage output from the transforming unit 3200 by taking into consideration the maximum power transmission efficiency, the amount of power required by the receiver and an amount of charge in the receiver.

In addition, the main control unit 3300 may control the transmission control unit 3400 according to the power transmission scheme. The main control unit 3300 may obtain information about the charge scheme from the receiver to control the transmission control unit 3400 according to the power transmission scheme.

The transmission control unit 3400 may include a first transmission control unit 3410 and a second transmission control unit 3420.

The first and second transmission control units 3410 and 3420 may control the power transmission according to the power transmission scheme.

The first transmission control unit 3410 may be a control unit to control power transmission through the electromagnetic induction scheme in a first charging scheme. That is, the first transmission control unit 3410 may control the operation for transmitting power to the wireless power reception apparatus through the electromagnetic induction scheme. Preferably, the first transmission control unit 3410 may be a wireless power consortium (WPC) controller. The WPC controller may control the operation for transmitting power to the wireless power reception apparatus located in a near field through the magnetic induction scheme. In addition, when the wireless power reception apparatus is detected within a critical distance, the WPC controller may control the operation to transmit power to the wireless power reception apparatus. In this case, the power transmission frequency may be in the range of 110 KHz to 205 KHz. In addition, the second transmission control unit 3420 may be a control unit to control power transmission through the resonance scheme in a second charging scheme. That is, the second transmission control unit 3420 may control the operation for transmitting power to the wireless power reception apparatus through the resonance scheme of the power transmission schemes. Preferably, the second transmission control unit 3420 may be an alliance for wireless power (A4WP) controller. When compared to the WPC controller, the A4WP controller can control the operation for transmitting power to the wireless power reception apparatus located far from the A4WP controller. In addition, the A4WP controller may include an A4WP Bluetooth (A4WP BLU) controller. Accordingly, when the power is transmitted to the wireless power reception apparatus through the magnetic resonance scheme, the A4WP BLU controller may perform the Bluetooth communication with the wireless power reception apparatus. That is, the A4WP BLU controller may receive wireless charging information and status information of the wireless power reception apparatus through the Bluetooth communication, and controls to transmit an operation control signal to the wireless power reception apparatus. The A4WP BLU controller may set the frequency for the power transmission differently from the frequency for the Bluetooth communication. Preferably, the frequency for the power transmission may be 6.78 MHz, and the frequency for the Bluetooth communication may be 2.4 GHz. The first and second transmission control units 3410 and 3420 may not be limited to the above.

The first transmission control unit 3410 may detect the wireless power reception apparatus and may be enabled or disabled to transmit the power the wireless power reception apparatus under the control of the main control unit 3300.

The first transmission control unit 3410 may be activated prior to the second transmission control unit 3420 under the control of the main control unit 3300. In the activation state, the first transmission control unit 3410 may detect the wireless power reception apparatus and may check whether the detected wireless power reception apparatus is wirelessly charged through the first charging scheme. Upon checking the charging scheme of the wireless power reception apparatus, if the first charging scheme is adopted in the wireless power reception apparatus, the first transmission control unit 3410 may control the operation to transmit the power to the wireless power reception apparatus. In addition, the first transmission control unit 3410 may operate based on the information about the charging scheme obtained from the receiver under the control of the main control unit 3300.

If the detected charging scheme is not the first charging scheme, the enabled first transmission control unit 3410 may be disabled under the control of the main control unit 3300.

In a state that the first transmission control unit 3410 is disabled, the second transmission control unit 3420 may be enabled under the control of the main control unit 3300. That is, the second transmission control unit 3420 is enabled in a state that the first transmission control unit 3410 is disabled, so that the second transmission control unit 3420 may detect the charging scheme of the wireless power reception apparatus under the control of the main control unit 3300. If the second charging scheme is adopted in the wireless power reception apparatus, the second transmission control unit 3420 may control the operation to transmit the power to the wireless power reception apparatus. In addition, the second transmission control unit 3420 may operate based on the information about the charging scheme obtained from the receiver under the control of the main control unit 3300.

Although it has been described in that the first transmission control unit 3410 is primarily enabled and the second transmission control unit 3420 is enabled when the first transmission control unit 3410 is disabled under the control of the main control unit 3300, the embodiment is not limited thereto. The first and second transmission control units 3410 and 3420 may be alternately operated.

The switch unit 3500 may be switched under the control of the main control unit 3300 in such a manner that the power generated from the transforming unit 3200 according to the charging scheme of the wireless power reception apparatus based on the operation of the first and second transmission control units 3410 and 3420 can be transferred to one of a resonance coil or an induction coil.

When the induction power transmission scheme is adopted, the switch unit 3500 may be switched according to a control signal of the main control unit 3300 in such a manner that the power generated from the transforming unit 3200 can be output to a first power converting unit 3610. In addition, when the magnetic resonance power transmission scheme is adopted, the switch unit 3500 may be switched according to a control signal of the main control unit 3300 in such a manner that the power generated from the transforming unit 3200 can be output to a second power converting unit 3620.

The switch unit 3500 may include one of an analog switch, a MOSFET and a transistor to perform a switching operation. The switch unit 3500 is not limited to the above, but various devices can be adopted if they can set the path through the switching operation.

The power converting unit 3600 may convert a DC voltage of a predetermined level into an AC voltage by a switching pulse signal in a band of several tens of KHz to several tens of MHz to generate power. The power converting unit 3600 may convert a DC voltage into an AC voltage to generate "wake-up power" or "charging power" used for the receiver to be charged. The wake-up power may be a micro power of 0.1 mWatt to 1 mWatt. The charging power may be a power necessary to charge a battery of the receiver or consumed to operate the receiver. The charging power may be in the range of 1 mWatt to 200 Watt consumed in the load of the receiver.

The power converting unit 3600 may include a power amplifier for amplifying the DC voltage output from the transforming 3200 according to a switching signal of the switch unit 3500.

The power converting unit 3600 may include an inverter. The power converting unit 3600 may convert a DC signal output from the transforming unit 3200 into an AC signal and adjust a frequency of the converted AC signal according to the power transmission scheme and under the control of the control unit. To this end, the power converting unit 3600 may include a full-bridge inverter or a half-bridge inverter. In addition, the transmission side DC/AC converting unit 1200 may include an oscillator for generating a frequency of an output signal and a power amplifier for amplifying the output signal.

The power converting unit 3600 may include a first power converting unit 3610 and a second power converting unit 3620 according to the charging scheme of the wireless power reception apparatus and may be operated under the control of the main control unit 3300 and the transmission control unit 3400.

The first power converting unit 3610 and the second power converting unit 3620 may perform the power transmission through mutually different schemes.

The first power converting unit 3610 may supply power to an induction coil 3810 through the magnetic induction scheme under the control of the first transmission control unit 3410. In addition, the second power converting unit 3620 may supply power to a resonance coil 3820 through the resonance scheme under the control of the second transmission control unit 3420.

The first power converting unit 3610 and the second power converting unit 3620 may generate AC signals having mutually different frequencies according to transmission schemes, respectively. Preferably, the first power converting unit 3610 may generate an AC signal of 110 KHz to 205 KHz under the control of the first transmission control unit 3410 according to the induction scheme (WPC) which is the first charging scheme. In addition, the second power converting unit 3620 may generate an AC signal of 6.78 KHz under the control of the second transmission control unit 3420 according to the resonance scheme (WPC) which is the second charging scheme.

The matching unit 3700 may include at least one of at least one passive element and at least one active element. The matching unit 3700 performs the impedance matching between a wireless power transmission apparatus 3000 and a receiver, so that power transmission efficiency may be maximized.

The matching unit 3700 may include a first impedance matching unit 3710 and a second impedance matching unit 3720 according to the transmission scheme. The first impedance matching unit 3710 and the second impedance matching unit 3720 may be connected to the first power converting unit 3610 and the second power converting unit 3620 of the power converting unit 3600, respectively.

The first impedance matching unit 3710 may perform the impedance matching with respect to the power output from the first power converting unit 3610 when the power transmission scheme is the magnetic induction scheme. The second impedance matching unit 3720 may perform the impedance matching with respect to the power output from the second power converting unit 3620 when the power transmission scheme is the resonance scheme.

The coil unit 3800 may include a first coil unit 3810 and a second coil unit 3820 according to the transmission scheme.

When the first charging scheme, that is, the magnetic induction scheme is adopted to the wireless power reception apparatus, the first coil unit 3810 may transfer the power output from the first impedance matching unit 3710 to the wireless power reception apparatus.

In addition, when the second charging scheme, that is, the resonance scheme is adopted to the wireless power reception apparatus, the second coil unit 3820 may transfer the power output from the second impedance matching unit 3720 to the wireless power reception apparatus.

In addition, the number of the first and second coil units 3810 and 3820 may be singular or plural. When a plurality of first and second coil units 3810 and 3820 are provided, they may overlap each other and the overlapping area is determined by taking into consideration a deviation of magnetic flux density and interference of the magnetic field.

The wireless power transmission apparatus 3000 may include a communication unit. The communication unit may perform bi-directional communication with a communication unit provided in the wireless power reception apparatus through a predetermined communication scheme, such as NFC (Near Field Communication), Zigbee communication, infrared communication, visible light communication, or Bluetooth communication.

In addition, the communication unit may transceive power information with the wireless power reception apparatus. The power information may include at least one of a capacity of the receiver, residual energy of a battery, the number of charging operations, an amount of use, a data rate. In addition, the communication unit may transmit a charging function control signal for controlling a charging function of the receiver based on the power information received from the receiver.

The charging function control signal may be a control signal for controlling the receiver such that a charging function is enabled or disabled.

The communication unit may perform the out-band communication or in-band communication.

Hereinafter, the wireless power transmission operation of the wireless power transmission apparatus having the above configuration according to an embodiment will be described with reference to FIG. 6.

FIG. 6 is a flowchart showing a wireless power transmission operation according to one embodiment.

Referring to FIG. 6, the main control unit 3300 may activate the first transmission control unit 3410 (S602) and output a signal for detecting the receiver (S604).

The main control unit 3300 may check whether the receiver is detected based on a response signal from the receiver in response to the output signal (S606).

If the response signal from the receiver in response to the output signal is detected, it may be determined that the receiver has the first charging scheme to which the power transmission is performed under the control of the first transmission control unit 3410. Thus, the main control unit 3300 may receive the charging information including an amount of required charge from the receiver (S608).

Thus, the main control unit 3300 may control the first transmission control unit 3410 based on the charging information to generate power through the first charging scheme and output the power to the receiver (S610).

Meanwhile, if the response signal is not received from the receiver or if the receiver is not detected even if the first transmission control unit 3410 is activated, the main control unit 3300 may change the status of the first transmission control unit 3410 into the deactivated state (S612).

Then, the main control unit 3300 may change the status of the second transmission control unit 3420 from the deactivated state into the activated state (S614).

As the second transmission control unit 3420 is activated, the main control unit 3300 may output a signal for detecting the receiver (S616).

The main control unit 3300 may determine whether the receiver is detected by checking whether the response signal in response to the output signal is received from the receiver (S618).

If the response signal from the receiver in response to the output signal is detected, it may be determined that the receiver has the second charging scheme to which the power transmission is performed under the control of the second transmission control unit 3420. Thus, the main control unit 3300 may receive the charging information including an amount of required charge from the receiver (S620).

Thus, the main control unit 3300 may control the second transmission control unit 3420 based on the charging information to generate power through the second charging scheme and output the power to the receiver (S622).

In the above embodiment, it has been described in that the receiver is detected by activating/deactivating the transmission control units under the control of the main control unit 3300. However, it is also possible to request the charging scheme information to the receiver through the communication unit to control the transmission control units based on the charging scheme information received from the receiver by receiving the response signal.

What is claimed is:

1. A wireless power transmission method of a wireless power transmission apparatus having a plurality of power transmission schemes, the method comprising:
 a first detection step comprising transmitting a first detection signal for a first power transmission scheme and detecting a first response signal corresponding to the first detection signal during a first predetermined time period;
 a second detection step comprising transmitting a second detection signal for a second power transmission scheme and detecting a second response signal corresponding to the second detection signal during a second predetermined time period;
 a determination step determining a power transmission scheme of an wireless power reception apparatus between the first power transmission scheme and the second power transmission scheme; and
 a power transmission step transmitting a power to the wireless power reception apparatus through the power transmission scheme.

2. The wireless power transmission method of claim 1, wherein the power transmission scheme is detected according to an initial detected wireless power reception apparatus.

3. The wireless power transmission method of claim 1, wherein the wireless power transmission apparatus transmits the power through one of the power transmission schemes according to a first wireless power reception apparatus that completes sending a charging information.

4. The wireless power transmission method of claim 1, wherein the first detection step is not proceeded while transmitting the power through the second power transmission scheme.

5. The wireless power transmission method of claim 1, wherein the power transmission step does not transmit the power through the first power transmission scheme while transmitting the power through the second power transmission scheme.

6. The wireless power transmission method of claim 1, wherein at least one of the first detection step and the second detection step is repeated when the power transmission step is completed.

7. The wireless power transmission method of claim 1, wherein the power transmission step transmits the power to a plurality of the wireless power reception apparatus through the first power transmission scheme or the second power transmission scheme.

8. The wireless power transmission method of claim 1, wherein the first detection step and the first power transmission scheme are performed via a first frequency band.

9. The wireless power transmission method of claim 8, wherein the second detection step is performed via a second frequency band different from the first frequency band, and wherein the second power transmission scheme is performed via third frequency band different from the first frequency band and the second frequency band.

10. The wireless power transmission method of claim 9, wherein the first frequency band is lower than the third frequency band, and wherein the second frequency band is higher than the third frequency band.

\* \* \* \* \*